United States Patent
Jappinen

(10) Patent No.: US 7,656,830 B2
(45) Date of Patent: *Feb. 2, 2010

(54) COMMUNICATIONS SYSTEM HAVING ENHANCED FAULT TOLERANCE

(75) Inventor: Teemu Jappinen, Espoo (FI)

(73) Assignee: Nokia Corporation, Espoo (FI)

( * ) Notice: Subject to any disclaimer, the term of this patent is extended or adjusted under 35 U.S.C. 154(b) by 428 days.

This patent is subject to a terminal disclaimer.

(21) Appl. No.: 11/604,755

(22) Filed: Nov. 28, 2006

(65) Prior Publication Data

US 2007/0070941 A1 Mar. 29, 2007

Related U.S. Application Data

(63) Continuation of application No. 10/169,944, filed as application No. PCT/FI01/00025 on Jan. 20, 2001, now Pat. No. 7,170,865.

(30) Foreign Application Priority Data

Jan. 14, 2000 (FI) .................................. 20000074

(51) Int. Cl.
*H04B 7/00* (2006.01)
(52) U.S. Cl. ..................... 370/310.1; 370/328; 370/225
(58) Field of Classification Search ........................ None
See application file for complete search history.

(56) References Cited

U.S. PATENT DOCUMENTS 6,314,098 B1  11/2001  Masuda et al.
6,404,740 B1   6/2002  Yoshida
6,556,573 B1*  4/2003  Kaaresoja ............... 370/395.64
6,594,265 B1*  7/2003  Etorre et al. ........... 370/395.51
6,744,726 B1   6/2004  Minami (Continued)

FOREIGN PATENT DOCUMENTS

EP          0 866 634 A2       9/1998

(Continued)

OTHER PUBLICATIONS

3GPP, "3rd Generation Partnership Project,Technical Specification Group Radio Access Network: General Aspects and Principles," 3G TS 24.410, Version 3.1.0, p. 1-23, (Jan. 2001).

(Continued)

*Primary Examiner*—Min Jung
(74) *Attorney, Agent, or Firm*—Pillsbury Winthrop Shaw Pittman LLP

(57) ABSTRACT

The invention relates to communications systems, and particularly to enhancing tolerance to failures in network elements and transmission systems. The fault tolerance is achieved by providing two or more active ATM permanent virtual channel (PVC) connections between a core network element and an access network element, and providing a separate ATM interface unit for each such ATM PVC connection in the core network element. The user and signalling traffic is distributed among these active connections and interface units. In case of a failure in one of the ATM PVC connections or interface units, the communication is maintained over the other connection(s) and interface unit(s). Thus, only part of the transport capacity is lost, and a total block of communication is avoided. Any new communication will be setup over the other connections.

13 Claims, 2 Drawing Sheets

U.S. PATENT DOCUMENTS

| | | |
|---|---|---|
| 6,785,243 B2 | 8/2004 | Angberg |
| 6,952,433 B1 | 10/2005 | Stumpert et al. |
| 6,973,054 B2 | 12/2005 | Bjelland et al. |
| 6,996,081 B1 | 2/2006 | Brouwer |
| 7,009,940 B2 | 3/2006 | Vialen et al. |
| 7,054,338 B2 | 5/2006 | Sutton |
| 7,170,865 B2 * | 1/2007 | Jappinen .................. 370/310.1 |

FOREIGN PATENT DOCUMENTS

| | | |
|---|---|---|
| GB | 2 324 001 | 10/1998 |
| JP | 07-131384 A | 5/1995 |
| JP | 08-186601 A | 7/1998 |
| JP | 10-257071 | 9/1998 |
| JP | 10-313316 | 11/1998 |
| JP | 11-205385 | 7/1999 |
| JP | 11-284632 | 10/1999 |
| WO | WO 99/37103 | 7/1999 |

OTHER PUBLICATIONS

Mouly M. et al., "GSM System for Mobile Communications, Chapter 9: Network Management," The GSM System, p. 566-647.

3GPP, "3rd Generation Partnership Project, Technifcal Specification Group Radio Access Network: UTRAN 1u Interface: General Aspects and Principles," 3G TS 25.410, Version 3.0.0, 23 pp, (Oct. 13, 1999).

3GPP, "3rd Generation Partnership Project, Technical Specification Group Service and Systems Aspects: Network Architecture," 3G TS 23.002, Version 3.1.0, 28 pp, (Oct. 13, 1999).

Ito et al., "Alternate Route Control for ATM Switching Systems," Technical Report of IEICE, vol. 97 ( No. 534), p. 25-30, (Feb. 5, 1998).

* cited by examiner

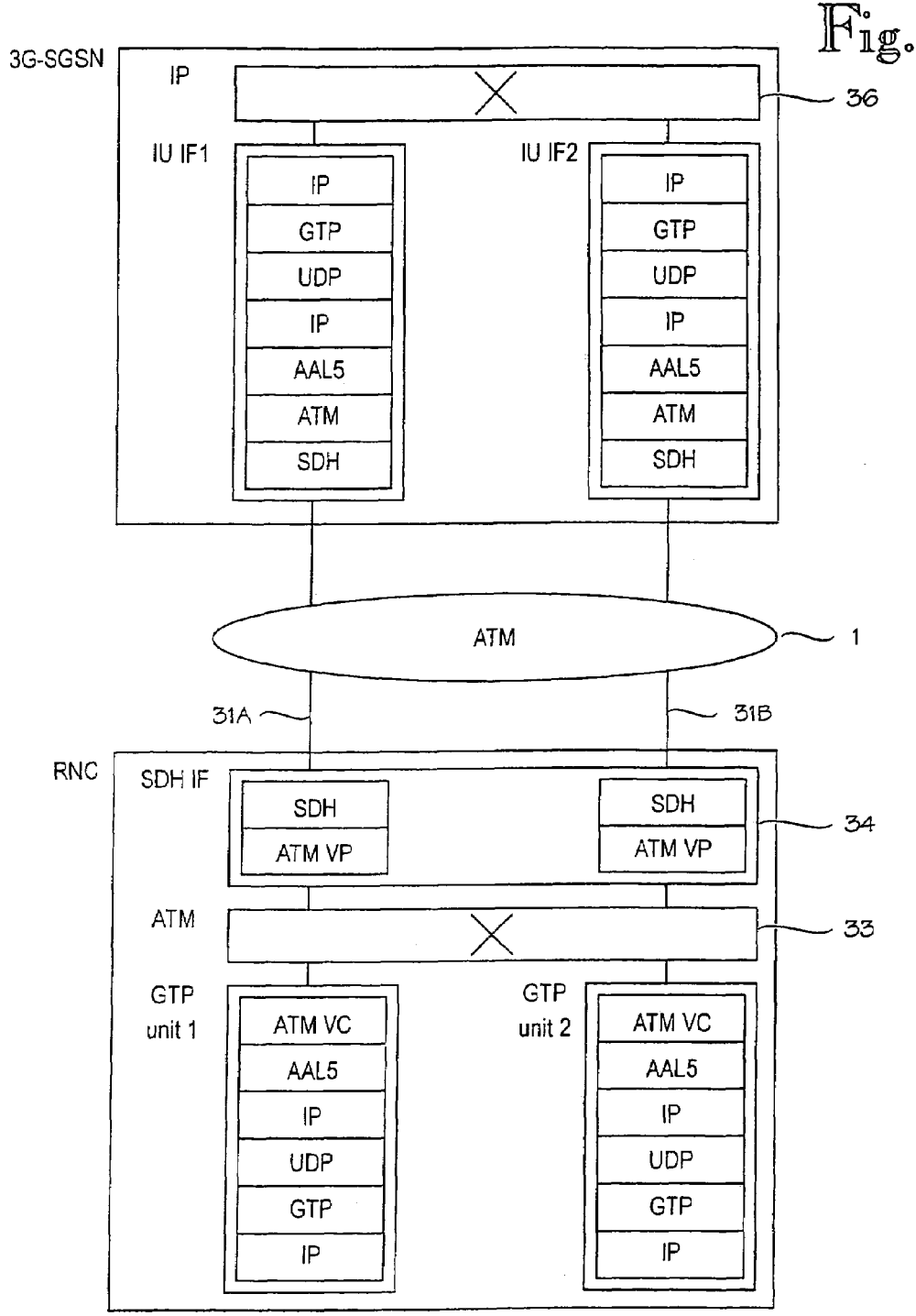

COMMUNICATIONS SYSTEM HAVING ENHANCED FAULT TOLERANCE

FIELD OF THE INVENTION

This is a continuation of U.S. patent application Ser. No. 10/169,944, filed on Jul. 11, 2002, Issue Fee Paid, which is the U.S. National Stage of International Patent Application No. PCT/FI01/00025, filed Jan. 12, 2001, which, in turn, relies for priority upon Finnish Patent Application No. 20000074, filed on Jan. 14, 2000, the contents of all of which are hereby incorporated by reference in their entireties.

BACKGROUND OF THE INVENTION

A mobile communications system generally refers to any telecommunications system wherein the access point (typically wireless access) to the system can change when users are moving within the service area of the system. A typical mobile communications system is a Public Land Mobile Network (PLMN). Often the mobile communications network is an access network providing a user with a wireless access to external networks, hosts, or services offered by specific service providers.

Currently, third-generation mobile communication systems, such as the Universal Mobile Communication System (UMTS) and the Future Public Land Mobile Telecommunication System (FPLMTS), which was later renamed as the International Mobile Telecommunication 2000 (IMT-2000) are under development. The UMTS is being standardized by the European Telecommunication Standards Institute (ETSI), whereas the International Telecommunication Union (ITU) standardizes the IMT-2000 system. These future systems are basically very similar. For example the UMTS, as all mobile communication systems, provides wireless data transmission services to mobile subscribers. The system supports roaming, which means that UMTS users can be reached and they can make calls anywhere as long as they are situated within the coverage area of the UMTS.

In the UMTS architecture the UMTS terrestrial radio access network, UTRAN, consists of a set of radio access networks RAN (also called radio network subsystem RNS) connected to a core network CN through the interface Iu. Each RAN is responsible for the resources of its set of cells. For each connection between a mobile station MS and the UTRAN, one RAN is a serving RAN. A RAN consists of a radio network controller RNC and a plurality of base stations BS. The RNC is responsible for the handover decisions that require signaling to the MS. The base stations are connected to the RNC through the Iub interface. The base station BS communicates with the mobile stations MS (or user equipments UE) over the radio interface Uu. The Uu and Iub interfaces are not relevant to the present invention and will not be described in more detail herein. Further information can be found in the UMTS specifications.

In the interface Iu between the radio network controller RNC and the core network the transfer technique is the ATM (Asynchronous Transfer Mode). The ATM transmission technique is a switching and multiplexing solution particularly relating to a data link layer (i.e. OSI layer 2, hereinafter referred to as an ATM layer. In the ATM data transmission the end users data traffic is carried from a source to a destination through virtual connections. Data is transferred over switches of the network in standard-size packets called ATM cells. The ATM cell comprises a header, the main object of which is to identify a connection number for a sequence of cells forming a virtual channel (VC) for a particular call through the transport network. A physical layer (i.e. OSI layer 1) may comprise several virtual paths (VP) multiplexed in the ATM layer. Each virtual path includes several VCs.

One core network which will use the UMTS radio access network is the general packet radio service (GPRS) which is a new service for the GSM system (Global System for Mobile communication), and a similar service is also being defined for the 3G mobile systems. A subnetwork comprises a number of packet data service nodes SN, which in this application will be referred to as serving GPRS support nodes SGSN (or 3G-SGSNs in the 3G systems). As illustrated in FIG. 1, each 3G-SGSN is connected to the RNC in the UTRAN over a transport network so that the 3G-SGSN can provide a packet service for mobile data terminals via several base stations, i.e. cells. The intermediate UTRAN provides a radio access and a packet-switched data transmission between the 3G-SGSN and mobile stations MS. Different sub-networks are, in turn, connected to an external data network, e.g. to a public switched data network PSPDN, via GPRS gateway support nodes GGSN. The GPRS service thus allows to provide packet data transmission between mobile data terminals and external data networks when the UTRAN (or the GSM) network functions as a radio access network.

In order to guarantee interoperability between different vendors of networks and network elements, the present 3G specifications specify that the RNC and the 3G-SGSN are connected using point-to-point ATM permanent virtual channel (PVC) connections. These signals can be carried over different transport networks, such as the ATM network or the Synchronous Digital -Hierarchy (SDH) network. The 3G specifications do not, however, specify how these ATM PVC connections are set up but allow the operators and vendors to use different solutions.

A problem in such a system may be fault tolerance of the ATM PVC connections. In the worst case, a failure in the PVC connections or in the interfaces at the RNC and the 3G SGSN may block all communication. The current 3GPP Iu interface specifications only specify that if redundancy of pathways of the ATM layer between the CN and the RNC is supported, it shall be implemented using ATM protection switching according to ITU-T recommendation I.630. Since I.630 does not support 1:n and m:n architectures another backup PVC connection is required for each ATM PVC connection, which doubles the number of ATM PVCs between RNC and 3G-SGSN.

Most present ATM switches do not support ATM layer protection according I.630. This means that the use of the ATM protection between ATM edge switch and RNC/3G-SGSN is not necessarily possible. Also the use of end-to-end ATM layer protection between the RNC and the 3G-SGSN is not possible, if the ATM network does not support ATM OAM according I.610 (i.e. does not generate end-to-end ATM-AIS cells in case of link failure).

SUMMARY OF THE INVENTION

An object of the present invention is to provide a new mechanism for providing fault tolerance.

This and other objects and advantages of the invention are achieved by means of communications systems as recited in the attached independent claim. Preferred embodiments of the invention are described in the dependent claims.

A first aspect of the invention is a communications system comprising
a core network element,
at least one access network element, a transport network providing Asynchronous Transfer Mode (ATM) permanent virtual channel (PVC) connections between the core network element and said at least one access network element, two or more ATM interface units in the core network element, two or more active ATM PVC connections between each of said at least one access network element and said core network element, different ATM PVC connections from any one of said at least one access network element being connected to different ones of said two or more ATM interface units, and ATM traffic being spread over said different ATM PVC connections in order to improve tolerance of the communications system to failures in the ATM PVC connections or in the ATM interface units.

According to the invention, the fault tolerance is achieved by 1) providing two or more active ATM PVC connections between a core network element, such as an SGSN, and an access network element, such as an RNC, and 2) providing a separate ATM interface unit for each such ATM PVC connection in the core network element. As used herein, the term active connection refers to a connection carrying user communication or signalling (in contrast to standby or redundant connections which are kept inactive or in reserve until the primary connection fails). The user and signalling traffic is distributed among these active connections and interface units. In case of a failure in one of the ATM PVC connections or interface units, the communication is maintained over the other connection(s) and interface unit(s). Thus, only part of the transport capacity of the RNC node is lost, and a total block of communication is avoided. Any new communication will be setup over the other connections. In an embodiment of the invention, also the traffic of the lost connection is rerouted via the other connections. Thus, outside of the peak traffic periods, all or major part of the traffic can be served.

The present invention does not require redundant connections as the ATM protection switching proposed in the prior art, thus offering savings in transport network costs. Further, in the primary embodiment of the invention, no special functionality, such as a special protocol, is required. Still further, a link or physical layer protection, such as the ATM or SDH protection switching, is not needed.

BRIEF DESCRIPTION OF THE DRAWINGS

The invention will be described below in greater detail in connection with preferred embodiments, with reference to the accompanying drawings, in which FIG. 4 shows a more detailed internal structure of the RNC and 3G-SGSN for user data and signalling, respectively.

PERFERRED EMBODIMENTS OF THE INVENTION

The present invention can be applied in any telecommunication system using ATM PVC connections over a transport network for interconnecting an access network to a core network. The primary field of application of the invention is an interconnection between a third-generation mobile network, such as the UMTS, and a third generation core network, such as the 3G-GPRS. In the following, the preferred embodiments of the invention will be described by using the UMTS and the 3G-GPRS as examples.

Figure 1:
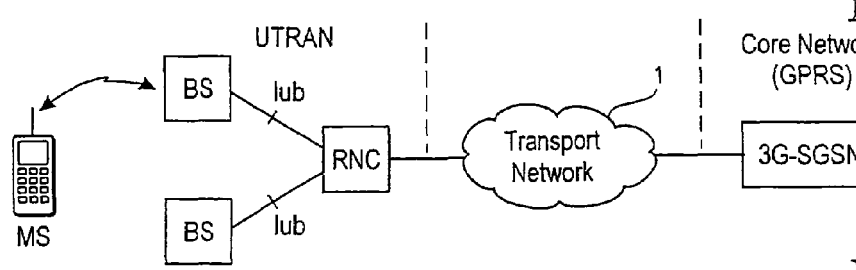
FIG. 1 illustrates a prior art interconnection of a radio access network and a third-generation core network over a transport network.
Figure 2:
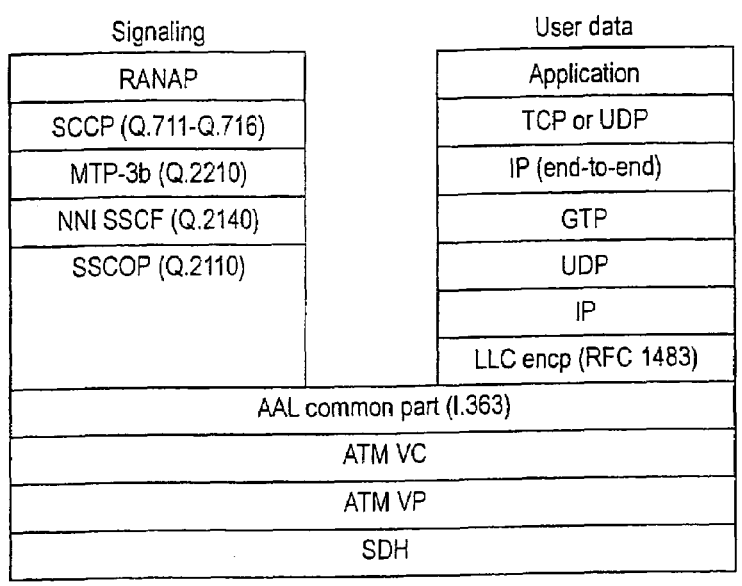
FIG. 2 illustrates a generic protocol stack for the Iu interface.

FIG. 2 illustrates the protocol stack for signalling and user data in the Iu interface. At the bottom of the transport network layer there is an ATM adaptation layer (AAL) which enhances the service provided by the ATM layer to support functions required by higher layers. The AAL performs mapping between the ATM layer and the next higher layer. At the moment there are three different types of AAL, namely type 1 AAL (AAL1), type 2 AAL (ML2) and type 5 AAL (AAL5). In FIG. 2, the type 5 AAL (AAL5) is shown. Below the AAL layer an ATM virtual channel (VC) and a virtual path (VP) are shown. Further below there are SDH layers, such as SDH VC-4 path, SDH multiplex section, SDH Regenerator Section, etc. However, it should be appreciated that other technique may be used instead of the SDH to carry the ATM connections. In the present invention, the transport network 1 is preferably an ATM network having at least one ATM switch between the RNC and the SGSN.

Figure 3:
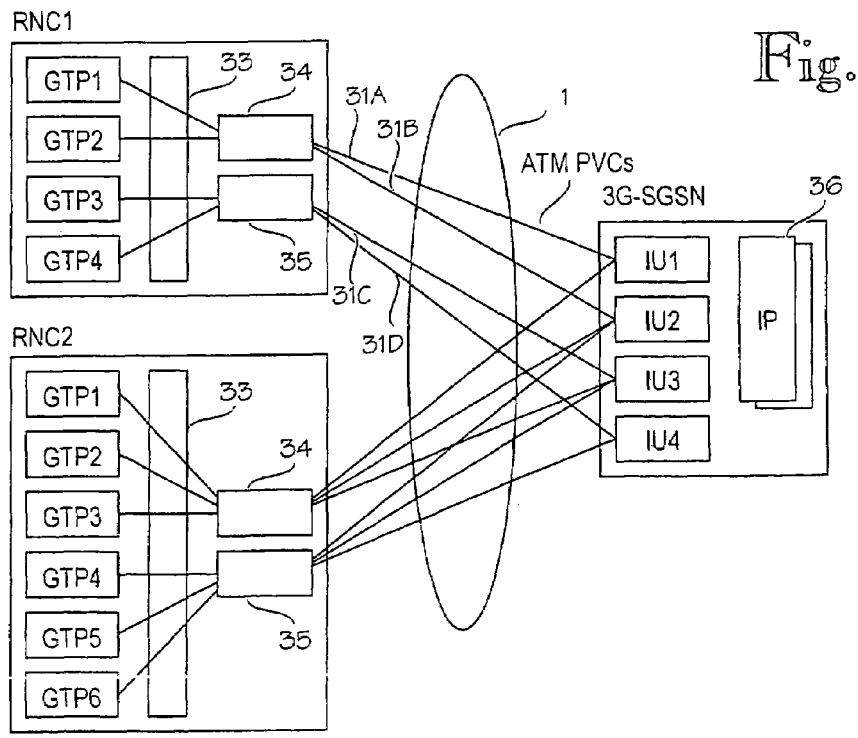
FIG. 3 shows a communications system having two RNCs connected to the 3G-SGSN in accordance with the principles of the present invention.

FIG. 3 illustrates a communication system having improved fault tolerance in accordance with the present invention. Two access network elements, such as radio network controllers RNC1 and RNC2, are connected to a core network element, such as a third generation SGSN. The 3G-SGSN is provided with several ATM interface units. In the embodiment shown in FIG. 3, there are four interface units IU1, IU2, IU3 and IU4. In the RNC1 the user data traffic is distributed over several GTP units GTP1, GTP2, GTP3 and GTP4. The units GTP1 and GTP2 are connected via an ATM switch 33 to an SDH interface unit 34 and further over the ATM network 1 to different interface units IU1 and IU2 by means of dedicated ATM permanent virtual channel (PVC) connections 31A and 31B, respectively. Similarly, the units GTP3 and GTP are connected through the ATM switching unit 33 to an SDH interface unit 35 and further over the ATM network 1 to different interface units IU3 and IU4 by means of dedicated ATM PVC connections 31C and 31D, respectively.

The connection between the RNC2 and the 3G-SGSN is based on the same principles. Each of the units GTP1 to GTP6 are connected over dedicated ATM-PVC connections to different interface units 1-4 in the 3G-SGSN. Thus, each of the interface units IU1-4 may be used by two or more RNCs, so that also the loss of capacity due to a failure in an interface unit in the 3G-SGSN will be distributed over several RNCs.

As a consequence, the user traffic is distributed over four active ATM PVC connections and respective interface units IU. If there is a failure in one of the PVC connections or in one of the interface units IU1-IU4, only twenty-five percent of the capacity of the 3G-SGSN is lost. However, the traffic over the remaining PVC connections and interface units will be maintained. If the remaining capacity allows, the calls from the failed connection and interface unit may be rerouted or re-established via the unaffected PVC connections and interface units.

In the GPRS system a call is established by setting up a protocol data protocol (PDP) context in the mobile station MS and in the SGSN. The PDP context defines different data transmission parameters, such as the PDP type (e.g. IP), PDP address (e.g. IP address), quality of service QoS, etc. When one of the interface units IU1-IU4 fails (or sometimes also when PVC connections 31A, 31B, 31E and 31F fail), all PDP contexts associated with the failed unit (or connection) are failed. It is possible that the failed PDP contexts are left to hang until the mobile station MS releases them upon detecting that the communication fails. It is also possible that the 3G-SGSN releases the failed PDP context by sending a release_PDP_context message to the mobile station MS in accordance with the GPRS specifications. The mobile stations MS which have lost their active PDP context can activate them again for the unaffected PVC connections and interface units IU by sending an activate_PDP_context_request to the 3G-SGSN in accordance with the GPRS specifications. In case of a failure in the ATM-PVC connection, the PDP context of the failed ATM-PVC may be moved (re-routed) to another ATM-PVC; the 3G-SGSN sends a modify RAB request (i.e. "RAB_Assignment_Request" message of RANAP the protocol) to the RNC in accordance with the GPRS specifications.

In the preferred embodiment, when the call is rerouted or re-established, it is primarily the 3G-SGSN which decides which of the remaining connections and interface units is selected. The control function, by means of which the most suitable one of the connections is selected, is called a connection Admission Control (CAC) and will be described in more detail below.

A failure in an ATM-PVC connection in the interface unit IU1-4 can be detected by periodically sending ATM loop-back cells from the RNC over the ATM PVC connection to the respective interface unit IU in the 3G-SGSN. If the connection and the interface unit are operating properly, the loop-back cell will be looped back by the 3G-SGSN and received at the RNC within a predetermined monitoring period. If the loop-back cells are not received, the RNC considers that the respective ATM-PVC connection or the respective interface unit IU has failed. The 3G-SGSN may also be provided with an internal control system which is able to detect whether the interface units are operating properly or not.

FIG. 4 illustrates a more detailed structure of the GTP units, an interface unit IU and the SDH interface unit 34. Each of the interface units IU1-4 contains for the user data the following protocol stack (from top to bottom): IP, GPT, UDP, IP, AAL5, ATM, and SDH. The topmost IP layer is connected to the higher layers (see FIG. 2) via an IP switching unit 36. In the RNC, each GTP unit 1-4 contains the following protocol stack (from top to bottom): IP, GTP, UDP, IP, AAL5, and ATMVC. Each SDH interface unit 34 and 35 contains the protocol layer ATMVP, and SDH. The ATM VC layers from the GTP units are multiplexed to the ATM VPs in the SDH interface unit 34 by means of the ATM switching unit 33. The ATM switching unit 33 allows a flexible cross-connection between the GTP units and the SDH interface units.

It should be noted that the number of units shown in FIGS. 3-4 may vary on demand. The minimum requirement is that there is at least two ATM interface units in the 3G-SGSN.

When the mobile user requests a new connection (e.g. IP connection, UMTS network, has to decide if there is enough free capacity to accept the connection. This process is called Connection Admission Control (CAC) which is implemented in the 3G-SGSN. In an embodiment of the invention the set up of the new IP connection contains following steps: (1) the MS sends a PDP context activation message to the 3G-SGSN, (2) the 3G-SGSN checks the IP backbone and 3G-SGSN resources, (3) 3G-SGNS selects the GTP unit and sends a RAB_assignment message the to the RNC, (4) the RNC estimates the air interface and radio network resources, (5) the RNC selects a GTP unit and sends a RAB_assignment_complete message to the 3G-SGSN. Further, in accordance with the GPRS specifications, the PDP context is also created in a gateway support node GGSN.

In accordance with an embodiment of the invention, the CAC functionality in the 3G-SGSN carries out the following steps: (1) selects an interface unit IU during PDP context activation, (2) If needed, triggers a PDP context modification in case of a Serving RNC Relocation procedure in order to place the PDP context into an interface unit IU having enough capacity, (3) keeps an equal traffic loading in all interface units IU, (4) estimates the resources of the interface units IUs based on the existing PDP contexts, configured maximum limits for each IP traffic class and CPU loading, and (5) estimates the resources of GTP units based on the existing PDP contexts and ATM PVC QoS parameters.

The description only illustrates preferred embodiments of the invention. It is obvious that as technology advances the basic idea of the invention can be implemented in several different manners. Therefore the invention and the embodiments thereof are not restricted to the examples described above, but they may vary within the scope of the claims.

The invention claimed is:

1. A core network element in form of serving packet radio support node for a communication system including at least one access network element in form of a radio network controller and a transport network providing Asynchronous Transfer Mode (ATM) permanent virtual channel (PVC) connections between the core network element and said at least one access network element, said core network element comprising:
two or more ATM interface units;
means for providing two or more active ATM PVC connections between said core network element and each of said at least one access network element, such that different ATM PVC connections from any one of said at least one access network element are arranged to be connected to different ones of said two or more ATM interface units, and
means for spreading an ATM traffic over said different ATM PVC connections in order to improve tolerance of the communications system to failures in the ATM PVC connections or in the ATM interface units.

2. A core network element as claimed in claim 1, wherein said core network element is configured to, responsive to a failure in one of said two or more ATM PVC connections, route the traffic to other one or ones of said two or more ATM PVC connections.

3. A core network element as claimed in claim 1, wherein said core network element is configured to, responsive to a failure in one of said two or more ATM PVC connections, drop said failed connection or let the failed connection to hang until higher level system protocols release the connection.

4. A core network element as claimed in claim 1, wherein said core network element is configured to detect a failure in the ATM PVC connection by performing a predetermined link test procedure.

5. A core network element as claimed in claim 4, wherein said link test protocol includes periodical sending of ATM loop-back cells.

6. A core network element as claimed in claim 1, wherein said core network element is arranged to select one of the interface units for establishing, rerouting or re-establishing the call based on traffic loading and capacity of the interface units.

7. A core network element as claimed in claim 1, wherein said core network element is responsive to a packet data context request from a user terminal for selecting the one of the interface units into which the packet data context is placed.

8. A core network element as claimed in claim 1, wherein said core network element comprises a third generation serving general packet radio service support node.

9. An access network element in form of a radio network controller for a communications system including at least one access network element, a core network element and a transport network providing Asynchronous Transfer Mode (ATM) permanent virtual channel (PVC) connections between the core network element and said access network element, said access network element comprising:
- means for providing two or more active ATM PVC connections between said access network element and two or more ATM interface units of said core network element, such that different ATM PVC connections from said at least one access network element are arranged to be connected to different ones of said two or more ATM interface units of said core network element, and
- means for spreading an ATM traffic over said different ATM PVC connections in order to improve tolerance of the communications system to failures in the ATM PVC connections or in the ATM interface units.

10. An access network element as claimed in claim 9, wherein said at least one access network element is configured to, responsive to a failure in one of said two or more ATM PVC connections, route the traffic to other one or ones of said two or more ATM PVC connections.

11. An access network element as claimed in claim 9, wherein said at least one access network element is configured to, responsive to a failure in one of said two or more ATM PVC connections, drop said failed connection or let the failed connection to hang until higher level system protocols release the connection.

12. An access network element as claimed in claim 9, wherein said at least one access network element is configured to detect a failure in the ATM PVC connection by performing a predetermined link test procedure.

13. An access network element as claimed in claim 9, wherein said link test protocol includes periodical sending of ATM loop-back cells.

* * * * *